(12) United States Patent
McGovern

(10) Patent No.: US 6,505,965 B1
(45) Date of Patent: Jan. 14, 2003

(54) INTRAORAL DENTAL RADIOGRAPHIC FILM PACKET WITH FLAVORED/SCENTED MOLDED FRAME AND METHOD FOR FORMING SAME

(75) Inventor: Michael R. McGovern, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 97 days.

(21) Appl. No.: 09/635,384

(22) Filed: Aug. 9, 2000

(51) Int. Cl.[7] .......................... A61B 6/14; G03B 42/02; G03C 5/16
(52) U.S. Cl. ........................ 378/169; 378/168
(58) Field of Search ................ 378/169, 167, 378/168

(56) References Cited

U.S. PATENT DOCUMENTS

| | | | |
|---|---|---|---|
| 1,537,925 A | 5/1925 | Bolin | 378/169 |
| 1,631,497 A | 6/1927 | Marler | 378/169 |
| 2,084,092 A | 6/1937 | Kenney | 378/169 |
| 3,198,515 A | 8/1965 | Pitney | 271/97 |
| 3,443,093 A | 5/1969 | Lindenmuth et al. | 378/169 |
| 3,721,472 A | 3/1973 | Mammel | 406/83 |
| 4,165,132 A | 8/1979 | Hassan et al. | 406/10 |
| 4,626,216 A | 12/1986 | Strong-Grainger | 433/229 |
| 4,791,657 A | 12/1988 | Kirsch et al. | 378/169 |
| 4,805,201 A | 2/1989 | Strong-Grainger | 378/169 |

(List continued on next page.)

FOREIGN PATENT DOCUMENTS

| | | |
|---|---|---|
| EP | 0564011 | 10/1993 |
| FR | 2627076 | 8/1989 |

OTHER PUBLICATIONS

U.S. patent application Ser. No. 09/534,368, Bacchetta et al., filed Mar. 24, 2000.
U.S. patent application Ser. No. 09/533,867, Bacchetta et al., filed Mar. 24, 2000.
U.S. patent application Ser. No. 09/534,372, Bacchetta et al., filed Mar. 24, 2000.
U.S. patent application Ser. No. 09/534,393, Bacchetta et al., filed Mar. 24, 2000.
U.S. patent application Ser. No. 09/534,370, Bacchetta et al., filed Mar. 24, 2000.
U.S. patent application Ser. No. 09/533,868, Resch et al., filed Mar. 24, 2000.
U.S. patent application Ser. No. 09/534,392, Earnhart et al., filed Mar. 24, 2000.
U.S. patent application Ser. No. 09/534,516, Resch et al., filed Mar. 24, 2000.

*Primary Examiner*—Robert H. Kim
*Assistant Examiner*—Courtney Thomas
(74) *Attorney, Agent, or Firm*—Mark G. Bocchetti

(57) ABSTRACT

An intraoral x-ray film packet is taught which includes compounding flavor/scent chemistry into a thermoplastic material. The thermoplastic material is then used to form a molded thermoplastic frame (preferably injection molded) thereby providing an intraoral radiographic film packet which has a comfort enhancing perimetric edge which is preferably permanently integrated therewith during manufacture. The comfort of the intraoral radiographic film packet is augmented through the addition of pleasing flavors and/or scents incorporated into the thermoplastic material. This flavor and/or scent can be fully compounded into the comfort edge thermoplastic materials as noted above, or alternatively, it can be compounded directly into the thermoplastic materials used to produce the packet layers prior to film insertion and thermal seal.

22 Claims, 6 Drawing Sheets

U.S. PATENT DOCUMENTS

| | | | |
|---|---|---|---|
| 4,847,884 A | 7/1989 | Dove | 378/168 |
| 4,852,143 A | 7/1989 | Scheier et al. | 378/168 |
| 4,911,871 A * | 3/1990 | Liese, Jr. | 264/102 |
| 4,912,740 A | 3/1990 | Liese | 378/169 |
| 4,913,288 A | 4/1990 | Tanaka | 206/455 |
| 4,922,511 A | 5/1990 | Gay | 378/169 |
| 5,044,008 A | 8/1991 | Jackson | 378/168 |
| 5,077,779 A | 12/1991 | Steinhausen, Jr. | 378/168 |
| 5,102,118 A | 4/1992 | Vits | 271/195 |
| 5,170,423 A | 12/1992 | Yuroska | |
| 5,209,387 A | 5/1993 | Long et al. | 226/97.3 |
| 5,285,491 A | 2/1994 | Muylle et al. | 378/168 |
| 5,327,477 A * | 7/1994 | Levy | 378/168 |
| 5,470,420 A | 11/1995 | Yokajty | 602/5 |
| 5,784,433 A | 7/1998 | Higa | 378/168 |
| 5,912,285 A * | 6/1999 | Godsey | 119/707 |
| 6,309,101 B1 * | 10/2001 | Bacchetta et al. | 378/168 |

* cited by examiner

INTRAORAL DENTAL RADIOGRAPHIC FILM PACKET WITH FLAVORED/SCENTED MOLDED FRAME AND METHOD FOR FORMING SAME

CROSS-REFERENCE TO RELATED APPLICATIONS

The present application is related to U.S. application Ser. No. 09/533,868, filed Mar. 24, 2000, by Resch, et al., and entitled, "INTRAORAL DENTAL RADIOGRAPHIC FILM PACKET WITH INJECTION MOLDED COMFORT-ENHANCING EDGE BEAD"; U.S. application Ser. No. 09/534,392, filed Mar. 24, 2000, by Earnhart, et al., and entitled, "METHOD FOR MAKING AND HANDLING AN INTRAORAL X-RAY FILM PACKET"; and U.S. application Ser. No. 09/534,516, filed Mar. 24, 2000, by Resch, et al., and entitled COMFORT-ENHANCING INTRAORAL DENTAL RADIOGRAPHIC FILM PACKET AND METHOD FOR FORMING SAME.

FIELD OF THE INVENTION

The present invention relates generally to x-ray film packets and, in particular, to intraoral radiographic film packets with scented and/or flavored comfort enhancing features.

BACKGROUND OF THE INVENTION

A common problem experienced by people visiting the dentist is the discomfort and pain associated with the taking of dental x-rays caused by the positioning of intraoral radiographic film packets in the patient's mouth. The typical intraoral radiographic film packet includes relatively hard and/or relatively sharp edges that press against and irritate the gums and other oral soft tissue of the person whose teeth are being x-rayed. A variety of intraoral x-ray dental packets are known in the prior art which include features intended to be comfort enhancing. In addition, attempts have been made to create comfort enhancing structures into which intraoral-x-ray dental packets can be inserted prior to placement in the patient's mouth. One example of this type of structure is taught in U.S. Pat. No. 5,044,008 to Jackson. Jackson utilizes a cartridge cushion comprising a foam sheet sandwich into which the x-ray dental packet is placed for the purpose of cushioning and increasing the comfort to the patient. Jackson requires the manual insertion of the x-ray packet into the cartridge cushion. Thus, Jackson adds significant bulk to the packet and enhances the possibility of triggering a gag reflex action in the patient. Additionally, after the cartridge cushion is removed from the packet, it would be possible to reuse the cartridge cushion which would not be sanitary.

A second example of an add-on structure is taught in U.S. Pat. No. 5,285,491 to Muylle et al. Muylle et al. teaches sealing a film pack in an envelope consisting of a pair of thin pockets of injection molded plastic which are sealed with a band of adhesive tape. The envelope has no sharp edges and generally rounded corners. Thus, as with Jackson's device, this device requires manual insertion of the packet, adds significant bulk to the packet, enhances the possibility of triggering a gag reflex in the patient, and can also be reused in a non-sanitary manner.

U.S. Pat. No. 1,631,497 to Marler teaches a dental x-ray film package wherein a sensitized sheet is sandwiched between two opaque sheets. A heavy band of rubber is stretched about the periphery of the package to hold the package securely together and to provide the light tight joint.

U.S. Pat. No. 1,537,925 to Bolin teaches a dental x-ray film package wherein a pair of film sheets and the cover sheet are inserted into the container. The container consists of a frame including a backing portion in an enlarged continuous beading about the periphery thereof. The beading must be forced away from the backing portion and stretched peripherally in order to insert the film sheets and cover sheet therein. The container thus serves to hold the package together and provide the light tight seal.

U.S. Pat. No. 2,084,092 to Kenney teaches a dental film holder that is a stretchable vellum rubber plate with integral corner pockets into which an x-ray dental packet may be manually inserted. Kenny's dental film holder is intended to be reusable.

From the foregoing, it can be seen that nothing in the prior art sought to augment the comfort of a dental x-ray film packet through the addition of a flavor or scent adding compound thereto. The addition of flavors or scents can make the typically unpleasant experience of having dental x-rays taken less objectionable by masking the normal flavor/scent of the film packet which the patient may find objectionable. Further, such prior art fails to teach such flavor/scent augmentation through the compounding of flavor/scent chemistry directly into the thermoplastic materials from which a comfort enhancing frame is to be molded.

SUMMARY OF THE INVENTION

It is therefore the object of the present invention to provide an intraoral radiographic film packet with a comfort enhancing perimeter which is scented and/or flavored.

It is a further object of the present invention to provide an intraoral radiographic film packet which has a thermoplastic comfort enhancing perimeter frame permanently integrated therewith during manufacture, the thermoplastic from which the comfort enhancing perimeter frame is molded having flavor/scent chemistry compounded therein prior to molding.

The foregoing and numerous other features, objects and advantages of the present invention will become readily apparent upon a review of the detailed description, claims and drawings set forth herein. These features, objects and advantages are accomplished by compounding flavor/scent chemistry into a thermoplastic material. The thermoplastic material is then used to form a molded thermoplastic frame (preferably injection molded) thereby providing an intraoral radiographic film packet which has a comfort enhancing perimetric edge which is preferably permanently integrated therewith during manufacture. The comfort of the intraoral radiographic film packet is augmented through the addition of pleasing flavors and/or scents incorporated into the thermoplastic material. This flavor and/or scent can be fully compounded into the comfort edge thermoplastic materials as noted above, or alternatively, it can be compounded directly into the thermoplastic materials used to produce the packet layers prior to film insertion and thermal seal. The flavor/scent can also be incorporated into these same thermoplastic materials by means of a secondary process such as a spray or dip type or some form of a continuous coating process. If the secondary process such as dipping or spraying is employed as the means to add the scent/flavor to the thermoplastic material then the packet is conveyed through a bath containing the flavor/scent in solution at a set concentration. The packet is allowed to move through the bath containing the solution at a fixed speed and concentration in order to allow the flavor/scent to be absorbed into the thermoplastic at room temperature. A similar setup for equipment can be employed if the dental packets are sprayed with this solution. In both instances the cycle or process includes a drying step prior to any packaging. The flavor/scent chemistry is the same whether compounding or secondary operations are used to incorporate this modifier into the thermoplastic material.

DETAILED DESCRIPTION OF THE INVENTION

Figure 1:
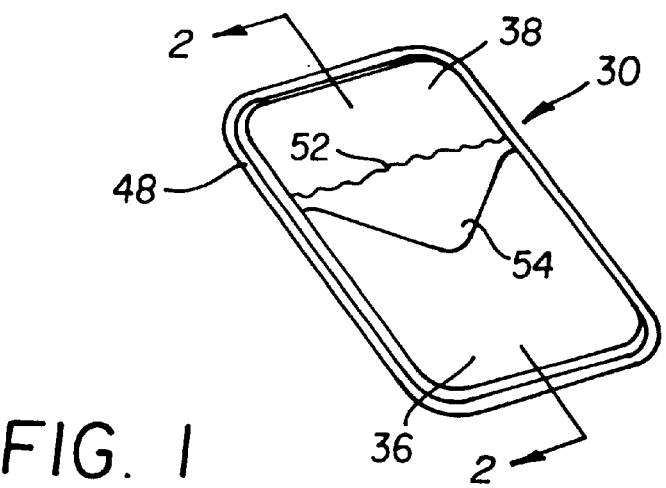
FIG. 1 is a perspective view of the improved dental film packet of the present invention prior to application of a perimetric edge bead.
Figure 2:
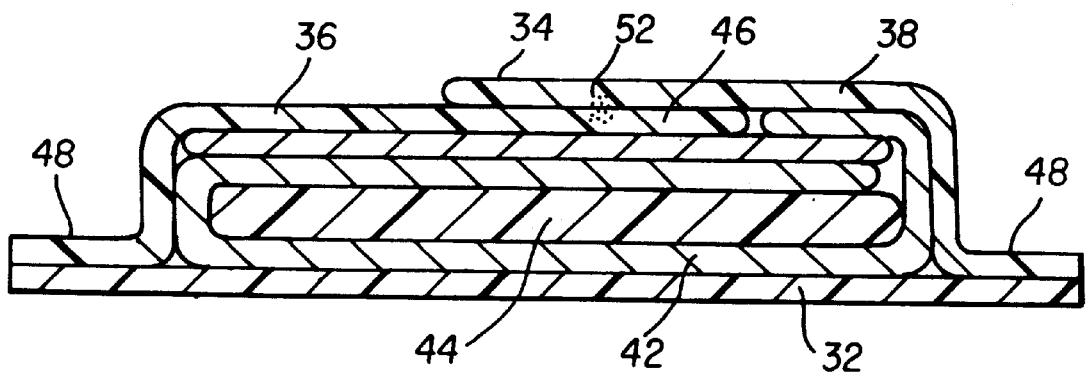
FIG. 2 is a cross-sectional taken along line 2—2 of FIG. 1.

Turning to FIGS. 1 and 2, there is shown an improved dental film packet 30 prior to the application of an injection molded perimetric edge bead. Dental film packet 30 includes an envelope comprising a first outer sheet or stiffening sheet 32 and an opposing second outer sheet 34. Second outer sheet 34 is actually comprised of a pair of overlapping sections 36 and 38. Outer sheets 32 and 34 are preferably made of a soft thermoplastic material such as, but not limited to polyvinyl chloride (PVC), ethylene vinyl acetate (EVA), or thermoplastic polyurethane (TPU), or a di-block polyamide copolymer.

Sandwiched between outer sheets 32 and 34 are the typical elements found in a dental x-ray film packet. There is a paper wrap element 42, the film chip 44 and a lead foil 46. The dental x-ray film packet 30 is assembled by placing the paper wrap element 42, the film chip 44 and a lead foil 46 between outer sheets 32 and 34 and sealing the outer sheets 32 and 34 to one another to form a perimetric laminated edge 48. Perimetric laminated edge 48 can be formed by heat sealing, RF sealing, ultrasonic sealing, or any other sealing mechanism which can create a substantially airtight bond between outer sheets 32 and 34. There is also a transverse seal (indicated by line 52) affixing overlapping sections 36 and 38 together. Overlapping section 38 is preferably formed with a tab portion 54 which extends past transverse seal 52 to facilitate removal of the envelope for extraction and development of the film chip 44 after exposure.

Outer stiffening sheet 32 is preferably formed from a more rigid material than that of outer sheet 34. In this manner, the laminated perimetric edge 48 becomes substantially coplanar with outer stiffening sheet 32. This flatter surface aids in the accurate positioning of the packet 30 in subsequent operations. Further, the more rigid material enhances the ability to die cut the packet 30 and maintain outside dimensions within tolerances. This enhances the ability to fit and accurately place the packet 30 in subsequent operations such as, for example, placement of the packet 30 in a comfort enhancing frame or applying a comfort enhancing bead thereto. This level of accuracy within dimensional tolerances is needed for automated assembly. As long as the material is more rigid, both outer sheets 32 and 34 forming the outer envelope of the packet 30 can be made of this more rigid material to garner the same benefits of positioning and dimensional control stated above.

One way of making outer stiffening sheet 32 more rigid is by reducing the amount of plasticizer used in the thermoplastic material of outer stiffening sheet 32 such that the thermoplastic material is less than 30 percent plasticizer. For example, in the case of polyvinyl chloride (PVC), the plasticizer could be dioctyl adipate (DOA), diethyl hexyl phthalate (DEHP) or dioctyl phthalate (DOP). The effect of reducing the amount of plasticizer is to increase the stiffness or modulus of the material from which outer sheet 32 is made so that during the heat sealing operation to form the perimetric laminated edge 48, the application of heat and the effects of the heating fixture do not as readily deform the material toward the center of the thickness of the packet 30.

The stiffening sheet 32 preferably has a tensile modulus in the range of from about 700 to about 28,000 Kg/cm$^2$. The envelope is formed by joining together the two outer plastic sheets at the marginal or peripheral area to form a perimetric laminated edge that preferably has a tensile modulus in the range of from about 400 to about 28,000 Kg/cm$^2$, and most preferably about 15,700 Kg/cm$^2$. By way of example, if PVC is used as the material for outer sheets 32 and 34, then outer stiffening sheet 32 should have a thickness in the range of from about 0.10 to about 0.33 mm. This combination of thickness and tensile modulus will achieve the necessary rigidity for the perimetric laminated edge 48 to remain substantially coplanar with outer stiffening sheet 32. Further, this combination of thickness and tensile modulus when laminated to second outer sheet 34 results in a perimetric laminated edge 48 which will not deform under the forces applied thereto by a Bernoulli positioning apparatus, such forces preferably being in the range of from about 5 to about 80 millinewtons and which are in a direction that is substantially parallel to the plane of outer stiffening sheet 32. Again, by way of example, using an outer sheet 34 made of PVC with a nominal thickness of about 0.20 mm and with a tensile modulus of about 310 Kg/cm$^2$ in combination with an outer stiffening sheet 32 having a thickness of about 0.20 mm and a tensile modulus of about 15,700 Kg/cm$^2$ results in a perimetric laminated edge 48 with a thickness of about 0.33 mm and a tensile modulus of about 15,600 Kg/cm$^2$. This exemplary perimetric laminated edge 48 will not deform as result of a force in the range of from about 5 to about 80 millinewtons applied to the perimetric laminated edge 48 and parallel to the plane of outer stiffening sheet 32.

Figure 3:
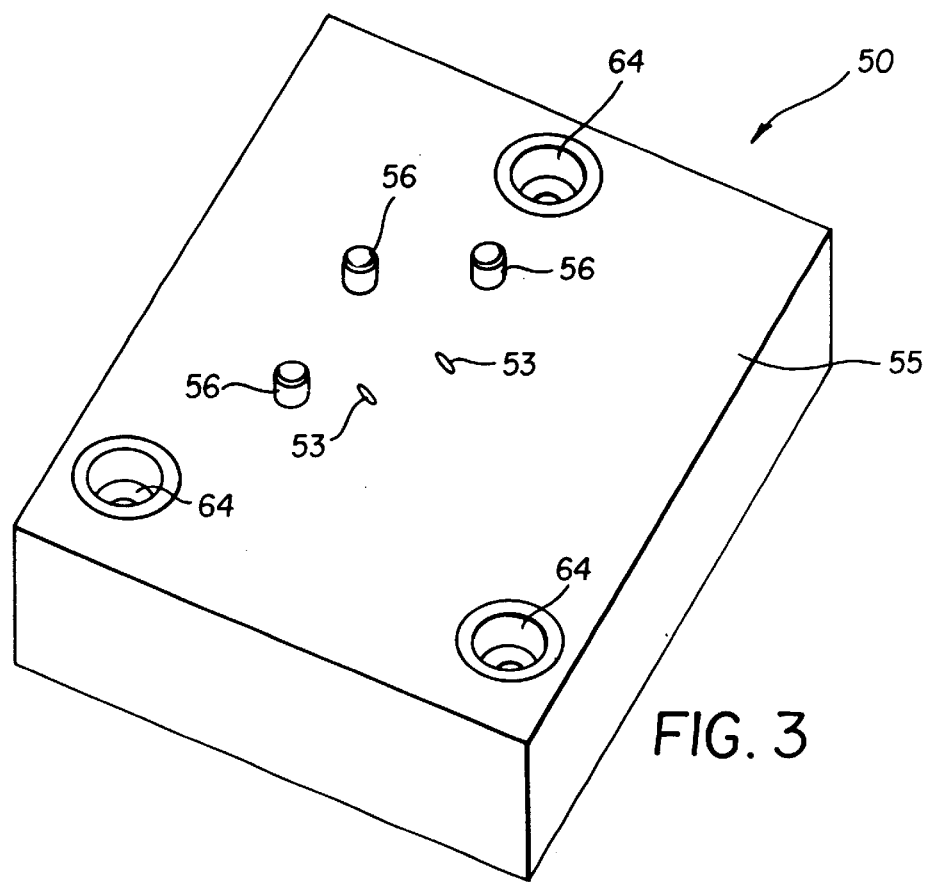
FIG. 3 is a perspective view of the Bernoulli positioning device used in the practice of the present invention.

Looking next at FIG. 3, during the manufacturing process, the intraoral dental radiographic film packet 30 is delivered it to a Bernoulli fixture 50. Delivery of the intraoral dental radiographic film packet 30 to a Bernoulli fixture 50 may be accomplished in a variety of ways such as, for example, a pick-and-place type mechanism with a vacuum cup used for packet acquisition and release. Application of the Bernoulli effect is used to orient and precisely position individual dental radiographic film packets 30. Compressed air is directed through a number of low angled air holes 53 in the top surface 55 of Bernoulli fixture 50. Air holes 53 are preferably inclined at an angle in the range of from about 15° to about 30° from horizontal, and most preferably at an angle of about 25° from horizontal. The angle of inclination of air holes 53 can be shallower than 15° but machining of such shallow angled holes becomes more difficult. This creates a laminar flow of air along the surface 55. This airflow imparts a force on the dental packet 30, driving the dental packet 30 against the fixture reference features 56 which provide hard stops in two dimensions and thereby fixes the location of the dental packet 30 in a horizontal plane. Because of the airflow velocity, the pressure between the surface 55 of the Bernoulli fixture 50 and the packet 30 is lower than the pressure on the side of the packet 30 away from the Bernoulli fixture 50. Thus the packet 30 remains attracted to the surface 55, rather than being pushed away. As mentioned above, perimetric laminated edge 48 should not deform under the forces applied thereto by the Bernoulli fixture 50, such forces preferably being in the range of from about 5 to about 80 millinewtons and in a direction that is substantially parallel to the plane of outer stiffening sheet 32. There are preferably also three locating ports 64 in top surface 55.

Figure 4:
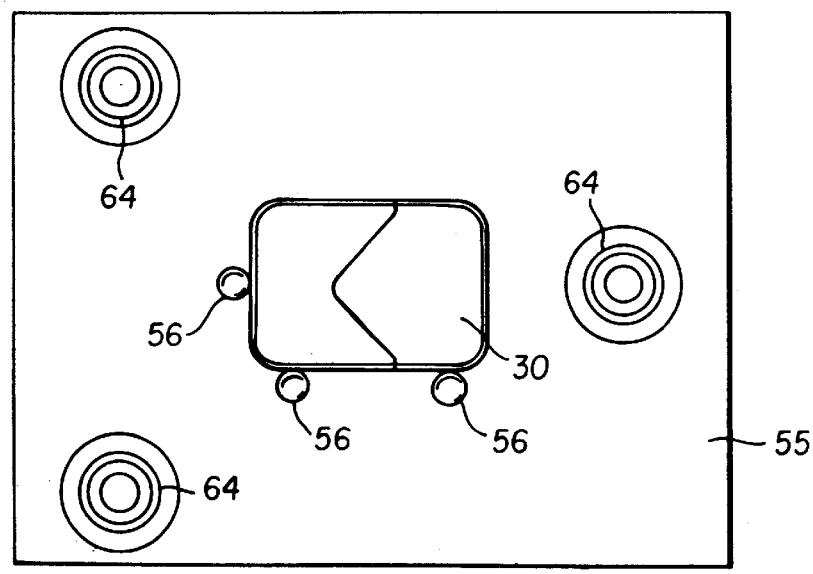
FIG. 4 is a top plan schematic of the dental film packet of FIG. 1 residing in the Bernoulli positioning device shown in FIG. 3.
Figure 5:
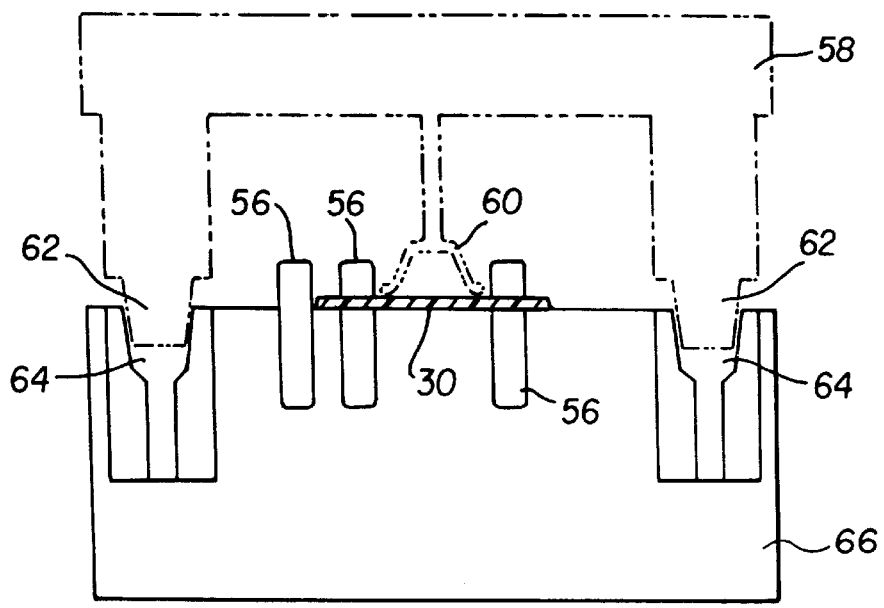
FIG. 5 is a side elevation/partial cross-sectional view of a robotic arm (in ghost) acquiring the dental film packet from the Bernoulli positioning device.

As shown schematically in FIG. 4, with the packet 30 accurately oriented in a known position against fixture reference features 56, packet 30 can be picked up by a robotic arm 58 having a vacuum cup 60 disposed on the end thereof (see FIG. 5). The robotic arm 58 may include locating pins 62 adapted to engage locating ports 64 in Bernoulli fixture 50 to ensure repeatable and precise acquisition of dental packets 30. Locating pins 62 engaging with locating ports 64 is just one method of ensuring repeatable and precise acquisition of dental packets 30. Other methods for repeatable and precise acquisition by a robotic arm are well known to those skilled in the art.

Figure 6:
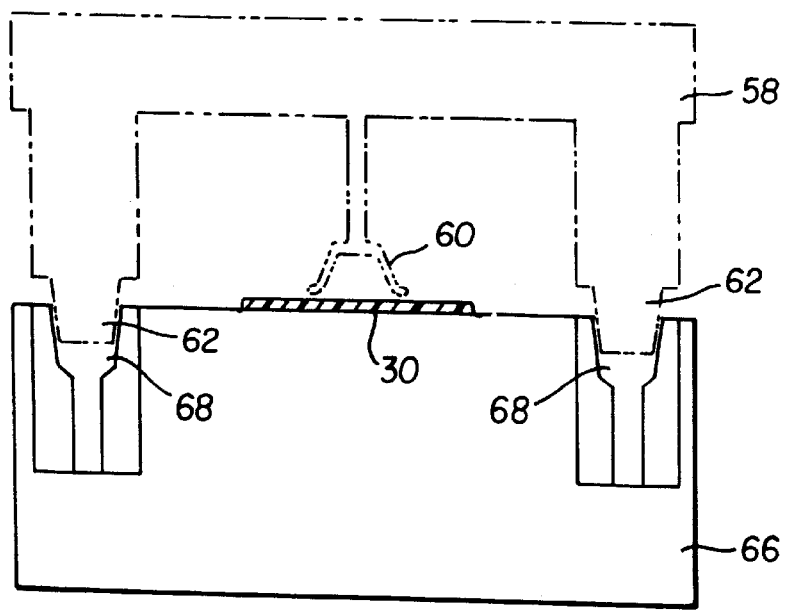
FIG. 6 is a side elevation/partial cross-sectional view of a robotic arm placing the dental film packet into an injection mold base.
Figure 7:
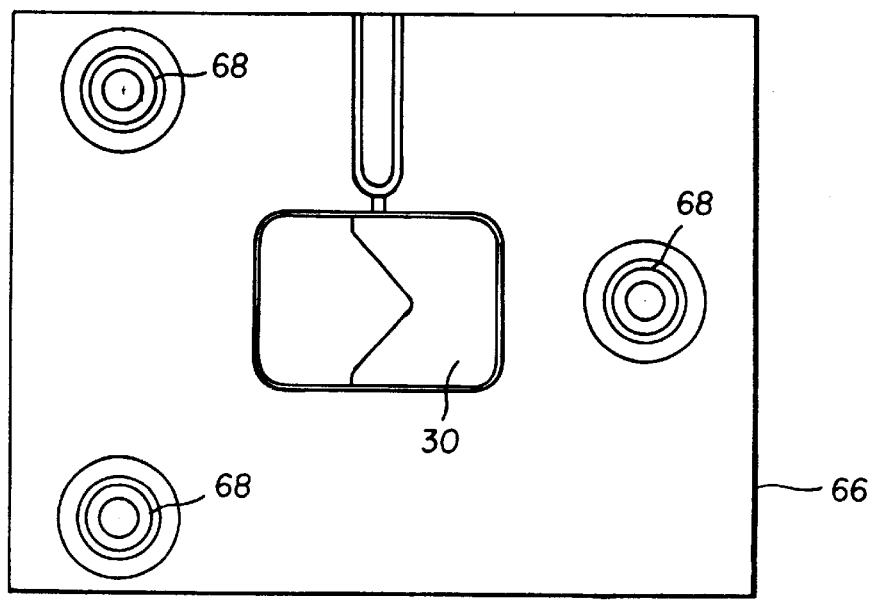
FIG. 7 is a top plan view of the dental film packet residing in the injection mold base.
Figure 9:
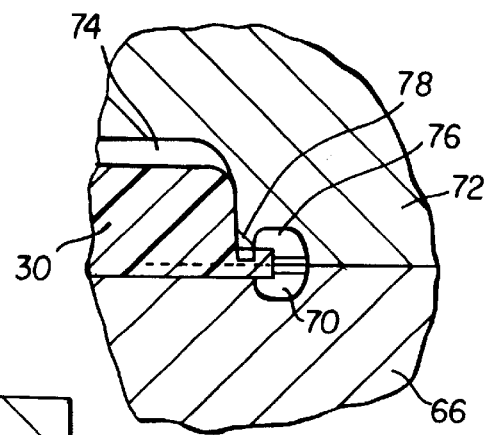
FIG. 9 is an enlarged view of the area within circle A of FIG. 8.
Figure 8:
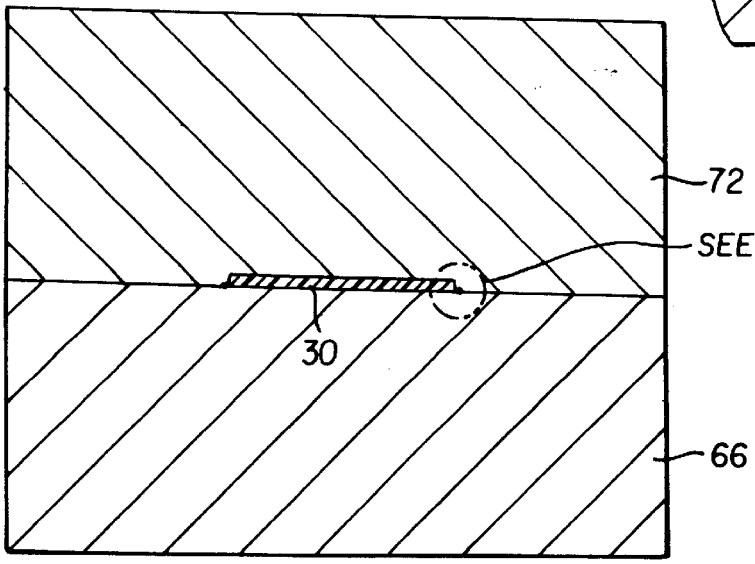
FIG. 8 is a cross-sectional view of the dental film packet residing between the mold base and upper mold half.
Figure 10:
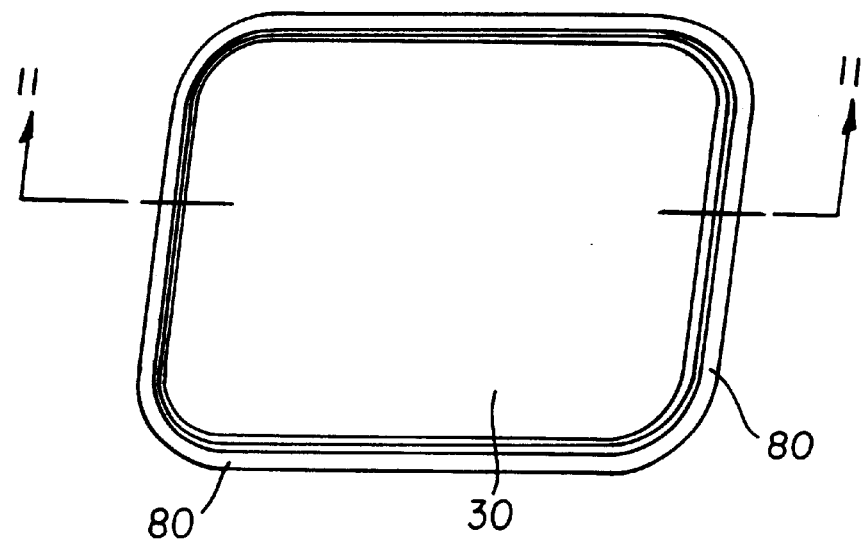
FIG. 10 is a perspective view of the dental film packet shown in FIG. 1 with a comfort enhancing perimetric edge bead molded thereto.
Figure 11:
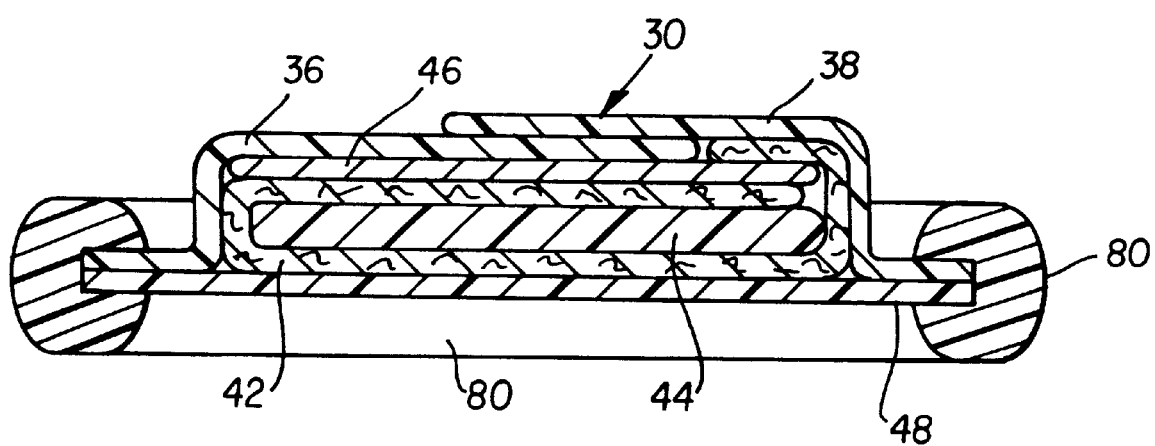
FIG. 11 is a cross-sectional view taken along line 11—11 of FIG. 10.

Once a dental film packet 30 has been acquired by vacuum cup 60 disposed on the end of robotic arm 58, the robotic arm 58 delivers the dental film packet 30 to an injection mold base 66 (see FIGS. 6 and 7). Injection mold base 66 includes locating ports 68 which, in conjunction with locating pins 62, ensure repeatable and precise placement of dental packets 30 into injection mold base 66 with reference to a lower bead canal 70 in the surface of injection mold base 66. With the dental film packet 30 so placed, vacuum pressure to vacuum cup 60 is discontinued and the robotic arm 58 leaves the dental film packet 30 on the injection mold base 66 as shown in FIG. 6. An upper mold portion 72 is then placed in abutting position with injection mold base 66 as depicted in FIG. 8. Upper mold portion 72 includes a packet cavity 74 in which a dental packet 30 resides (see FIG. 9), and an upper bead canal 76. Packet cavity 74 and upper bead canal 76 are separated by a continuous lip element 78. With injection mold base 66 and upper mold portion 72 residing in abutting position, perimetric laminated edge 48 extends into the mold cavity formed by lower bead canal 70 and upper bead canal 76. A comfort-enhancing perimetric edge bead 80 (see FIGS. 10 and 11) can then be formed on perimetric laminated edge 48 by injection molding of a thermoplastic material into the mold cavity formed by lower bead canal 70 and upper bead canal 76. The perimetric edge bead 80 is comprised of a generally compliant material and is of a generally rounded cross-section so as to reduce the cutting sensation of the packet 30 by implying a softer, smoother, more rounded feel to the patient's gums, lips and inside of the oral cavity. A soft thermoplastic material such as, but not limited to, polyvinyl chloride (PVC) is preferably used for perimetric edge bead 80. The thermoplastic material preferably has a relatively low durometer material (e.g. 50 to 90 Shore A) to enhance the soft feeling. Other materials that can be used for injection molding of perimetric edge bead 80 include, for example, thermoplastic elastomers and di-block polyamide copolymers.

It should be clear to those skilled in the art that the ability to accurately position a packet 30 in a Bernoulli fixture 50 by driving it against hard stop reference features 56 is affected by the flexibility of the marginal area (perimetric laminated edge 48). The added rigidity of outer sheet 32 should be great enough to resist deformation under the forces applied by the Bernoulli fixture 50. In addition, the added rigidity and planarity of marginal area (perimetric laminated edge 48) ensures residence in the mold cavity formed by lower bead canal 70 and upper bead canal 76. This, in turn, ensures encapsulation of the die-cut perimetric edge of the packet 30 which allows for the application of the comfort-enhancing perimetric edge bead 80 which encapsulates at least part of the sharp edges of the die-cut perimetric edge of the perimetric laminated edge 48.

Although stiffening sheet 32 has been described herein as being an outer sheet it should be apparent to those skilled in the art that an extra or third sheet could be applied outside the stiffening sheet 32. This extra or third sheet would however add to expense and bulk of each packet 30. Thus for the purposes of this application the term "outer sheet" includes an envelope forming sheet in which the paper wrap element 42, the film chip 44 and a lead foil 46 reside and which forms at least in part the laminated perimetric edge 48.

As mentioned above, the process by which the ingredients of the thermoplastic material and the flavor/scent chemistry are intimately melt mixed together into as nearly a homogeneous mass as is possible is known as compounding. Due to the nature of both the thermoplastic resin or elastomer and these modifiers, compounding can take on a wide range of mixing such as, for example, in the form of dry powders, slurries, pastes and doughy consistencies. Due to the wide range of mixing forms there is a corresponding wide range of mixing operations. Thus, the resulting configurations of equipment and parameters for optimum distribution and dispersion of the modifiers can vary greatly.

The task of mixing becomes one of changing the original distribution of two or more nonrandom or segregated masses so that an acceptable distribution and dispersion of one mass throughout the other is achieved. Thus, the challenge becomes one of deforming or redistributing masses in order to achieve the desired effect. The compounding process exerts shearing forces on these modifiers to produce a distribution of particle sizes (primary particles and agglomerates). This is the key step in the compounding process to achieve good overall dispersion of the modifier. The shearing forces are introduced through the use of either a single or twin set of segmented screws (both intermeshing and non-intermeshing) that can be set up to run in a clockwise or counterclockwise manner to maximize the dispersion efficiency of a given formulation.

The compounding process also exerts shear forces on the polymers. The viscosity is thus reduced so that the polymer will flow under pressure through a designed orifice (die). The thermoplastic material is essentially a fluid subjected only to laminar flow and is capable of being deformed. Thus, the problem of mixing in thermoplastics is that of subjecting such materials to laminar shear deformation in such a manner that an initially nonrandom distribution of ingredients approaches some arbitrary scale of randomness.

Mixing is usually complicated by the ingredients (modifiers) exhibiting interparticulate forces, so that the stresses accompanying the deformation must be considered as well as the deformation process itself.

The compounding process produces a long continuous strand, which is then cut to the desired individual length of single pellets suitable for use in other plastic conversion equipment such as injection molding machines.

Figure 12:
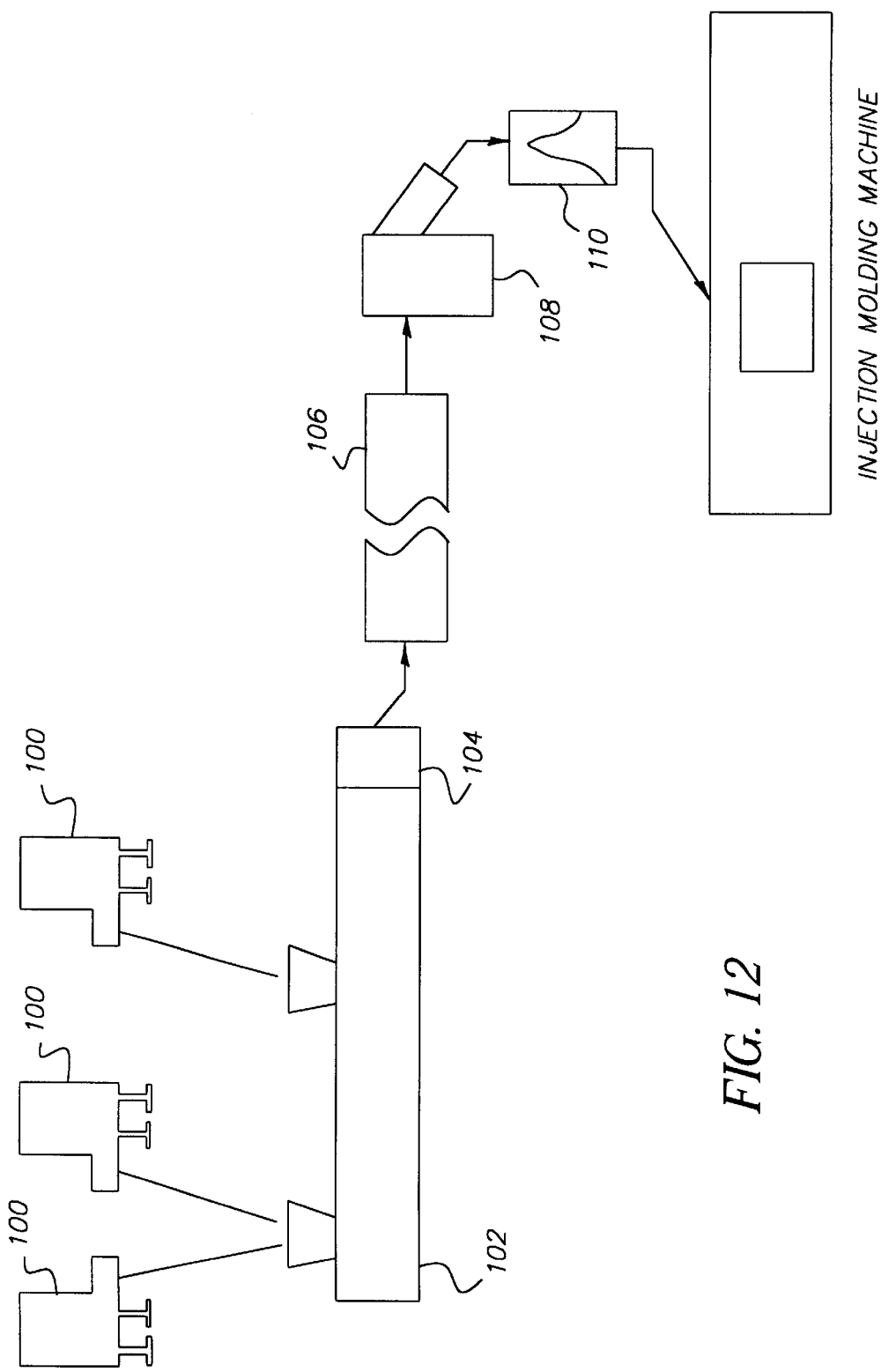
FIG. 12 is a schematic depicting an apparatus for compounding the thermoplastic material and the flavor/scent chemistry.

Looking next at FIG. 12 there is schematically depicted an apparatus for compounding the thermoplastic material and the flavor/scent chemistry to be used in the molding of frame 56. Raw material ingredients are fed by gravimetric feeders 100 to a twin-screw extruder 102. The raw materials are blended and melted in the twin-screw extruder 102 which includes a die 104 at the end thereof. Strands of thermoplastic material exit die 104 and enter cooler 106. The cooled strands of thermoplastic material are then delivered to a pelletizer 108 producing pellets of thermoplastic material which are delivered to bin 110.

The modifiers or additives to give flavor/scent to the thermoplastic material are added to the mixture via the gravimetric feeders 100. The modifiers or additives can be any one of several flavors and/or scents and/or adroitness from a number of different chemical categories. These categories include (but are not limited to) esters, alkyl halides, alcohols, ethers, carboxylic acids, aldehydes, ketones, amines, phenols, and amides including certain natural flavors and oils for flavors and/or scents and/or adroitness such as mint, and all synthetic flavors of an aromatic character. Thus, any aromatic organic compound that has odor and/or flavor characteristics could be made use of in the preparation of these additives or coatings depending on the desired result.

The use of animal products should be avoided. All agents should be either synthetic aromatic organic compounds or plant extracts.

Other categories of flavor/scent additives include plant extracts and the aliphatic organic compound ethyl acetate. Examples include peppermint, spearmint, vanilla and bubblegum. The range of percent composition will be defined to optimize the benefit of the invention without compromising product integrity and manufacturability.

Specific flavor/scent/odorant chemistries include octanol for an orange flavor and either 2-propionyl-1-pyroline or 2-propionyltetrahydropyridine, which result in intense roast smelling olfactory stimulation.

The weight percent of the flavor and/or scent additive in the polymer formulation is variable depending on the strength of the flavor or scent desired. In such manner, x-ray film packets can be targeted to different groups. For example, children may prefer a relatively strong cherry flavor. Adults may prefer a more subtle mint or citrus flavor. The flavor and/or scent additive can be as high as thirty-five (35) weight percent in any polymer recipe in order to achieve the desired flavor/scent effect.

The additive to achieve the flavor/scent is preferably integral (fully compounded) to the comfort edge bead 80. A variety of thermoplastics. may be used to produce the molded comfort edge. Examples include but are not limited to polyvinyl chloride, polyurethane, polyamide and various copolymers of said thermoplastics. However, as mentioned above the flavor/scent chemistry can be compounded into the thermoplastic material used to form one or both of sheets 32, 34 as opposed to the comfort edge bead 80, or the flavor/scent chemistry can be compounded into both the thermoplastic material used to form one or both of sheets 32, 34 and the comfort edge bead 80.

The integrated thermoplastic layers can be comprised of a number of different polymers such as polyvinyl chloride, thermoplastic elastomers, polyethylenes, polypropylenes, polyurethanes (both ester and ether based) and flexible polyamides.

The interfacial area between the thermoplastic material and any ingredients must be greatly increased so that ultimate dispersion and distribution can be achieved in order to assure uniformity. The mixture components should be distributed so that for any practical unit of volume, the ratio of components within the unit is the same as that of the whole system. In other words, the mixture should be substantially homogeneous.

Example

The table below presents the ranges of constituents which can be mixed to achieve an orange flavored thermoplastic material for use in the present invention, either in the material forming the comfort edge bead 80, or for the material forming one of the outer sheets 32, 34.

TABLE

| Constituent | Percent by weight |
| --- | --- |
| Base PVC polymer | 52 to 37 |
| DOA (DEHP) plasticizer | 30 to 35 |
| Calcium-zinc heat stabilizer complex | 0.5 to 2.0 |
| Colorants (such as monoazo pigments) | 1.0 to 3.0 |
| Scent/flavor (octanol orange flavor) | 15 to 20 |
| Lubricant (fatty acid such as stearic acid) | 0.02 to 0.5 |
| Processing aid such as poly-alpha-methylstyrene | 1.0 to 3.0 |

Other ingredients such as antistatic modifiers and impact modifiers can also be added depending on the application and the level of other ingredients.

From the foregoing, it will be seen that this invention is one well adapted to obtain all of the ends and objects hereinabove set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in a limiting sense.

PARTS LIST 30 dental film packet
32 first outer sheet or stiffening sheet
34 opposing second outer sheet
36 overlapping sections
38 overlapping sections
42 paper wrap element
44 film chip
46 lead foil 48 laminated perimetric edge
50 Bernoulli fixture
52 transverse seal
53 low angled air holes
54 tab portion
55 top surface
56 fixture reference features
58 robotic arm
60 vacuum cup
62 locating pins
64 locating ports
66 injection mold base
68 locating ports
70 lower bead canal
72 upper mold portion
74 packet cavity
76 upper bead canal
78 continuous lip element
80 perimetric edge bead
100 gravimetric feeders
102 twin-screw extruder
104 die
106 cooler
108 pelletizer
110 bin

What is claimed is:

1. An intraoral x-ray film packet comprising:
    (a) an envelope including a first thermoplastic outer sheet, a second thermoplastic outer sheet and a laminated perimetric edge;
    (b) a film chip contained within said envelope; and
    (c) a perimetric edge bead of a thermoplastic material, at least one of the perimetric edge bead, the first thermoplastic outer sheet and the second thermoplastic outer sheet having a scent and/or a flavor compounded therein by melt mixing the scent and/or flavor into the thermoplastic material used to form the perimetric edge bead, the first thermoplastic outer sheet and/or the second thermoplastic outer sheet.

2. An intraoral x-ray film packet comprising:
    (a) a first outer sheet formed of a thermoplastic material and having a tensile modulus of at least about 700 Kg/cm$^2$;
    (b) a second outer sheet formed of a thermoplastic material;
    (c) a film chip residing between said first outer sheet and said second outer sheet;
    (d) a perimetric seal affixing said first outer sheet and said second outer sheet and forming a perimetric laminated edge, said perimetric laminated edge being substantially coplanar with said first outer sheet; and
    (e) a perimetric edge bead injection molded from a thermoplastic material, at least one of the perimetric edge bead, the first outer sheet and the second outer sheet having a scent and/or a flavor compounded therein by melt mixing the scent and/or flavor into the thermoplastic material used to form the perimetric edge bead, the first thermoplastic outer sheet and/or the second thermoplastic outer sheet.

3. An intraoral x-ray film packet as recited in claim 2 wherein:
    said first outer sheet has a tensile modulus in the range of from about 700 Kg/cm$^2$ to about 28,000 Kg/cm$^2$.

4. An intraoral x-ray film packet as recited in claim 2 wherein:
    said perimetric laminated edge will not deform when subjected to a force of not more than about 80 millinewtons in a direction which is substantially parallel to the plane in which said first outer sheet resides.

5. An intraoral x-ray film packet as recited in claim 2 wherein:
    said perimetric laminated edge will not deform when subjected to a force of at least about 5 millinewtons and not more than about 80 millinewtons in a direction which is substantially parallel to the plane in which said first outer sheet resides.

6. An intraoral x-ray film packet as recited in claim 2 wherein:
    said perimetric laminated edge has a tensile modulus in the range of from about 400 to about 28,000 Kg/cm$^2$.

7. An intraoral x-ray film packet as recited in claim 2 wherein:
    said second outer sheet comprises a pair of overlapping sections.

8. An intraoral x-ray film packet as recited in claim 7 wherein:
    said second outer sheet further comprises a transverse seal affixing said pair of overlapping sections.

9. An intraoral x-ray film packet as recited in claim 8 wherein:
    one of said pair of overlapping sections includes a tab portion to facilitate removal of said first and second outer sheets.

10. An intraoral x-ray film packet as recited in claim 2 wherein:
    said first and second outer sheets are made from a thermoplastic material.

11. An intraoral x-ray film packet as recited in claim 2 wherein:
    said perimetric seal is formed by RF sealing.

12. An intraoral x-ray film packet as recited in claim 2 wherein:
    said perimetric seal is formed by heat sealing.

13. An intraoral x-ray film packet as recited in claim 8 wherein:
    said transverse seal is formed by RF sealing.

14. An intraoral x-ray film packet as recited in claim 8 wherein:
    said transverse seal is formed by heat sealing.

15. An intraoral x-ray film packet as recited in claim 10 wherein:
    said first outer sheet is made more rigid than said second outer sheet by reducing the amount of plasticizer in said thermoplastic material.

16. An intraoral x-ray film packet as recited in claim 10 wherein:
    said thermoplastic material of said first outer sheet includes less than 30% plasticizer.

17. An intraoral x-ray film packet as recited in claim 16 wherein:
    said second outer sheet contains more than 30% plasticizer.

18. A method for making an intraoral x-ray film packet comprising the steps of:
    (a) forming a first outer sheet from a thermoplastic material, the first outer sheet having a tensile modulus in the range of from about 700 to about 28,000 Kg/cm$^2$;
    (b) forming a second outer sheet from the thermoplastic material;
    (c) sealing the first outer sheet and the second outer sheet together to form an envelope with a laminated perimetric edge, the envelope containing a film chip, the laminated perimetric edge being substantially coplanar with the first outer sheet, and (d) molding a thermoplastic comfort enhancing edge bead directly onto the laminated perimetric edge to form a comfort enhancing edge bead, at least one of the comfort enhancing edge bead, the first outer sheet and the second outer sheet having a scent and/or a flavor compounded therein by melt mixing the scent and/or flavor into the thermoplastic material used to form the perimetric edge bead, the first thermoplastic outer sheet and/or the second thermoplastic outer sheet.

19. A method as recited in claim 18 wherein:

said sealing step results in the perimetric laminated edge having a tensile modulus in the range of from about 400 to about 28,000 Kg/cm$^2$.

20. A method as recited in claim 19 wherein:

said sealing step results in the perimetric laminated edge being able to resist deformation when subjected to a force of at least about 5 millinewtons and not more than about 80 millinewtons in a direction which is substantially parallel to the plane in which the first outer sheet resides.

21. A method for making an intraoral x-ray film packet comprising the steps of:

(a) compounding a thermoplastic material with a scent and/or a flavor;

(b) forming a first outer sheet;

(c) forming a second outer sheet;

(d) sealing the first outer sheet and the second outer sheet together to form an envelope with a laminated perimetric edge, the envelope containing a film chip, the laminated perimetric edge being substantially coplanar with the first outer sheet; and (e) molding the compounded thermoplastic material directly onto the laminated perimetric edge to form a comfort enhancing edge bead.

22. A method as recited in claim 21 wherein the second outer sheet is comprised of a thermoplastic material containing more than 30% plasticizer.

* * * * *